United States Patent [19]

Nakauchi

[11] 4,445,778
[45] May 1, 1984

[54] METHOD OF AND APPARATUS FOR MEASURING SCENE BRIGHTNESS

[75] Inventor: Kenji Nakauchi, Minami-ashigara, Japan

[73] Assignee: Fuji Photo Film Co., Ltd., Kanagawa, Japan

[21] Appl. No.: 218,566

[22] Filed: Dec. 22, 1980

[30] Foreign Application Priority Data

Dec. 21, 1979 [JP]  Japan .................................. 54-166692
Jan. 10, 1980 [JP]  Japan .................................... 55-1641
Jan. 11, 1980 [JP]  Japan .................................... 55-1921
Jan. 11, 1980 [JP]  Japan .................................... 55-1922
Jan. 21, 1980 [JP]  Japan .................................... 55-5445

[51] Int. Cl.³ ............................................. G01J 1/44
[52] U.S. Cl. .................................. 356/222; 354/432; 354/412; 356/221
[58] Field of Search ............... 356/222, 213, 216, 217, 356/218, 221, 225, 226; 354/31, 59, 42, 32, 33

[56] References Cited

U.S. PATENT DOCUMENTS

| | | | |
|---|---|---|---|
| 3,792,484 | 2/1974 | Tsujimoto et al. | 354/31 |
| 3,850,530 | 11/1974 | Uno et al. | 354/31 |
| 4,047,187 | 9/1977 | Mashimo et al. | 354/31 |
| 4,075,640 | 2/1978 | Ueda et al. | 354/31 |
| 4,104,654 | 8/1978 | Maitana et al. | 354/51 X |
| 4,182,573 | 1/1980 | Yamada et al. | 354/31 |
| 4,339,185 | 7/1982 | Nakauchi et al. | 354/25 |

Primary Examiner—Bruce Y. Arnold
Attorney, Agent, or Firm—Pasquale A. Razzano

[57] ABSTRACT

In a camera or a printer, exposure is controlled based on a selected mode of a light measuring system which has two modes of weighting the light measurement in for differently weighting various parts of an image of a scene according to whether the image is of a back light scene or a normal light scene. The light measuring means determines whether or not the difference in brightness between the central part and the marginal part of the image of a scene is smaller than a predetermined value. Pursuant to such determination, one of the modes of the light measuring system is selected, and the exposure is controlled by the output of the light measuring system in the selected mode.

3 Claims, 11 Drawing Figures

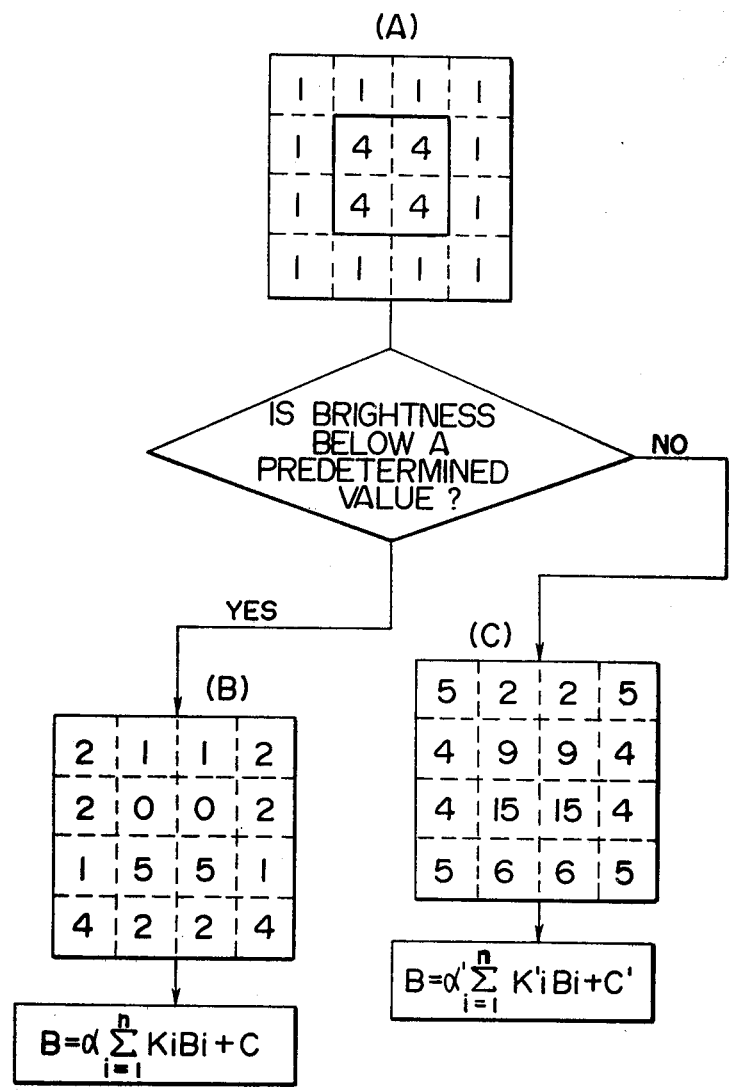
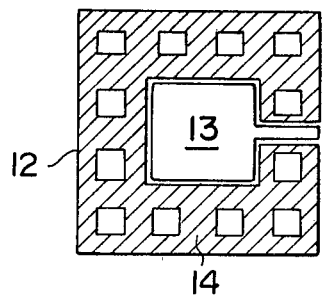

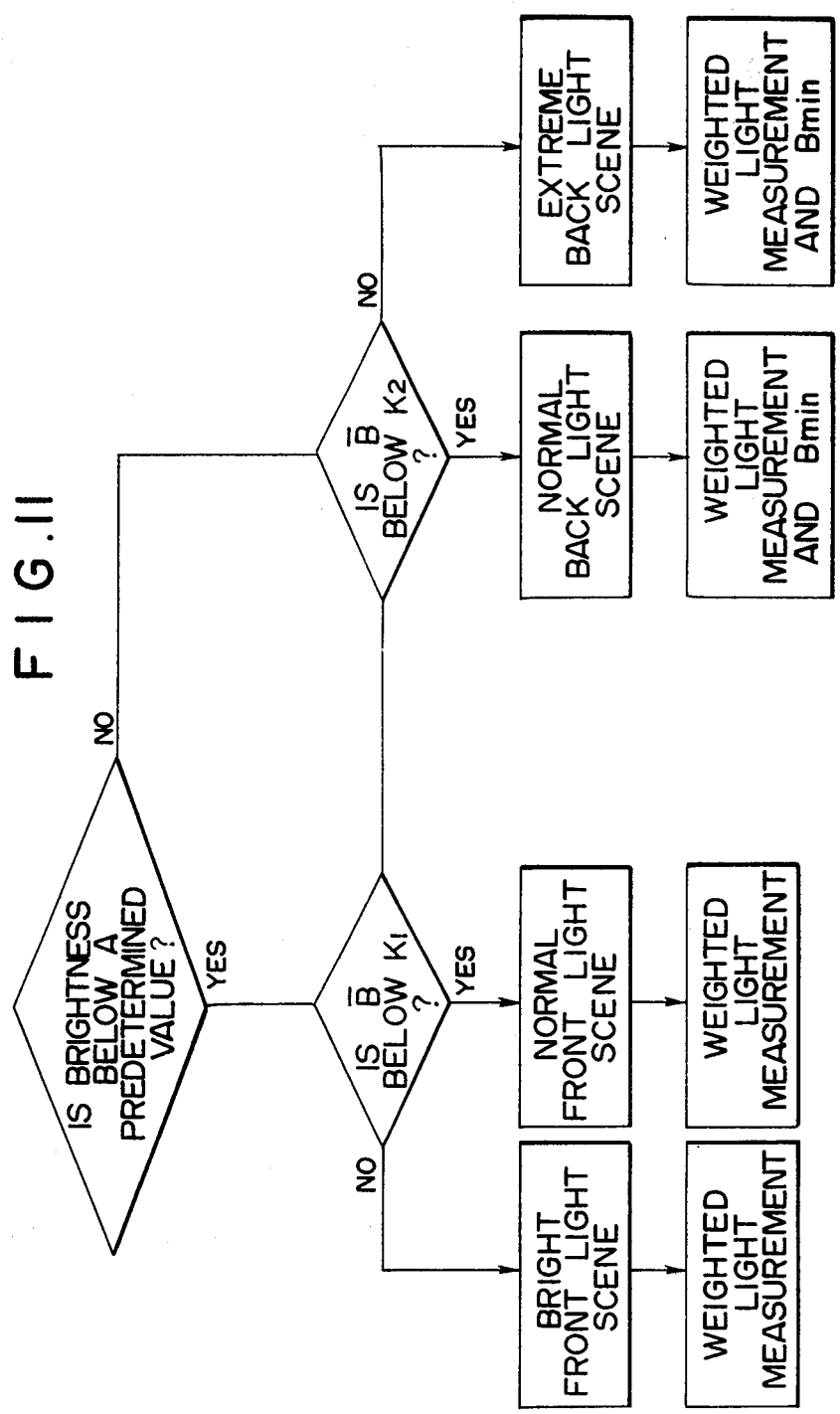

METHOD OF AND APPARATUS FOR MEASURING SCENE BRIGHTNESS

BACKGROUND OF THE INVENTION

1. Field of the Invention

This invention relates to an image information input system, and more particularly relates to a system for inputting image brightness information into an exposure control system for use in a photographic camera or a photographic printer in which various parts of an image are differently weighted for providing modified image information according to the kind of the scene of the image.

2. Description of the Prior Art

There have been known various kinds of light measuring systems such as averaged light measuring, center-weighted measuring system and partial measuring. In the averaged light measuring, the averaged value of the amount of light from the whole scene viewed by the taking lens of the camera is measured by use of a photodetector which has substantially the same angle of view as that of the taking lens. In this light measuring system, it is impossible to obtain a proper exposure of the subject matter to be photographed when there is a bright background behind the subject matter such as the sky or source of back light. Though it is known to correct the exposure controlled by the averaged light measuring system by use of a correction means which effects increase or decrease of the measured values, it is troublesome to operate such a correcting means and it is difficult to accurately correct the exposure by the optimum amount.

In the center-weighted measuring, the central part of an image is weighted in comparison with the marginal part. In the partial measuring, only a part of an image is measured. These two light measuring systems are based on an empirical rule that the subject matter of photography is normally located around the center of the scene aimed by a camera and weights the central part in comparison with the marginal part to lower the weight of the brightness information of the marginal part of a scene. Accordingly, these two light measuring systems are disadvantageous in that the exposure cannot be properly controlled based thereon if the subject matter is not located around the center of a scene or if the difference in brightness between the central part and the marginal part is too large.

Beside the above mentioned light measuring systems, there have been known in the art to use the maximum and minimum values of the brightness of some parts of a scene to obtain more practical information as disclosed in Japanese Unexamined Patent Publication Nos. 92622/1976, 13412/1978, 91224/1979 and Japanese Utility Model Publication No. 9271/1976, and to divide the scene into the upper half and the lower half to obtain information of these halves separately as disclosed in Japanese Unexamined Patent Publication Nos. 75422/1976, 96829/1978, 90926/1974, 90927/1974, 71834/1978, 118127/1978 and Japanese Patent Publication No. 8516/1971.

The scene or subject matter to be photographed or printed can be roughly classified into either a back light scene and a normal light scene. The deviation of the average brightness from the brightness of the subject matter is much different between the back light scene and the normal light scene. Therefore, it is necessary to make much different exposure between the two kinds of scene.

The above-mentioned various kinds of light measuring systems, however, are all disadvantageous in that it is very difficult to provide optimum light measuring or optimum image information for both kinds of the scene. More particularly, the above systems are effective for the normal light scenes but not for the back light scenes, because the photodetectors and the processing circuit are always of the same type for both kinds of scenes.

OBJECTS AND SUMMARY OF THE INVENTION

A primary object of the present invention, therefore, is to provide an image information input system which is capable of providing the optimum value of image information for both the normal light scenes and the back light scenes.

Another object of the present invention is to provide an image information input system which is able to change its mode of weighting automatically according to whether the scene is a back light scene or a normal light scene.

Still another object of the present invention is to provide an image information input system which is able to properly select the mode of weighting automatically according to the kind of the scene by use of a scene classifying means.

The above objects of the present invention are accomplished by using a classifying means which classifies the scene into either one or the other of a normal light scene and a back light scene by determining if the difference between the brightness of the central part and the brightness of the marginal part of the scene is smaller than a predetermined value.

Still another object of the present invention is to provide an image information input system which is able to give a warning signal when the scene is a back light scene.

In general, in case of the normal light scene, the difference in brightness between the subject matter and the background is small. In such a case, averaged light measuring is desirable. On the contrary, in case of the back light scene, the difference in brightness therebetween is large. In such a case, center-weighted light measuring is desirable.

In view of this observation, it is desirable that the light measuring mode be properly selected according to the kind of the scene. The present invention, therefore, is based on this concept and is provided with two kinds of image information read-out and operating means to be properly selected automatically according to the kind of the scene.

As for the image information read-out and operating means, there may be used either an optical weighting system in which a mask for differently weighting a number of photodetectors by changing covering size thereof to change the light receiving area of the photodetectors or changing transmittance thereof to change the intensity of the light received by the photodetectors is used and the outputs of the photodetectors are simply summed up, or an electrical weighting system in which all the parts of the scene are uniformly measured without using a mask and the outputs of the photodetectors are weighted by use of different resistors.

The selection of the proper mode of the light measuring means or the image information read-out and operating means may be made automatically by means of a scene classifying device. The scene classifying device can be made by utilizing the outputs of the photodetectors which measure the difference between the brightness of the central part of a scene and the brightness of the marginal part thereof. In accordance with the output of the scene classifying device, the mode of the image information read-out and operating means is properly selected. The selection may be made by changing over the two kinds of operating means by use of a power change over means or by selectively turning on analog switches.

Further, in case of the back light scene wherein the subject matter is normally liable to be under-exposed, it is desirable to use an electronic flash device. Therefore, it is desirable to give a warning signal in case of the back light scene so that the photographer may be able to use an electronic flash to fill in and adequately illuminate the subject.

Furthermore, in case of the back light scene, the brightness of the subject matter has normally a close relationship with the minimum brightness. Therefore, it is desirable that the exposure be controlled based on both the minimum brightness and the sum of the weighted brightnesses of the various parts of the scene. Further, it is also possible to control the exposure based on the minimum brightness alone.

BRIEF DESCRIPTION OF THE DRAWING

FIG. 4 is a flow chart for explaining an embodiment of a light measuring system of the present invention, FIG. 5 is a front view showing an example of a photodetector array to be used for classifying the scene, FIG. 11 is a flow chart for explaining another example of the present invention in which the scenes are classified into four kinds of scenes.

DESCRIPTION OF THE PREFERRED EMBODIMENTS

Now certain preferred embodiments of the present invention will be described in detail with reference to the accompanying drawings.

Figure 1:
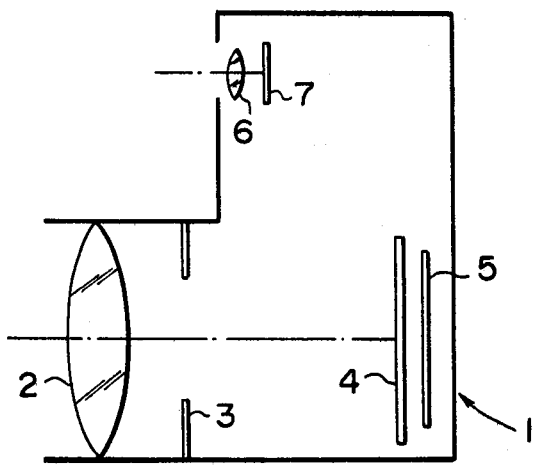
FIG. 1 is a schematic side sectional view showing an example of a photographic camera in which the light measuring means is provided in accordance with the present invention.

Referring to FIG. 1 showing an example of a camera to be provided with the light measuring device of the present invention, a camera body 1 is provided with a taking lens 2 in front face thereof, an aperture 3 just behind the taking lens 2, a shutter curtain immediately in front of a film 5 located at the back of the camera body 1, and a light measuring device 6, 7 located above the taking lens 2. The light measuring device is axially composed of an objective lens 6 having its optical axis parallel to that of the taking lens 2, and a light receiving portion 7 located on the focusing plane of the objective lens 6. The light receiving portion 7 is connected with an operating circuit for operating the output of the light receiving portion 7.

Figure 2:
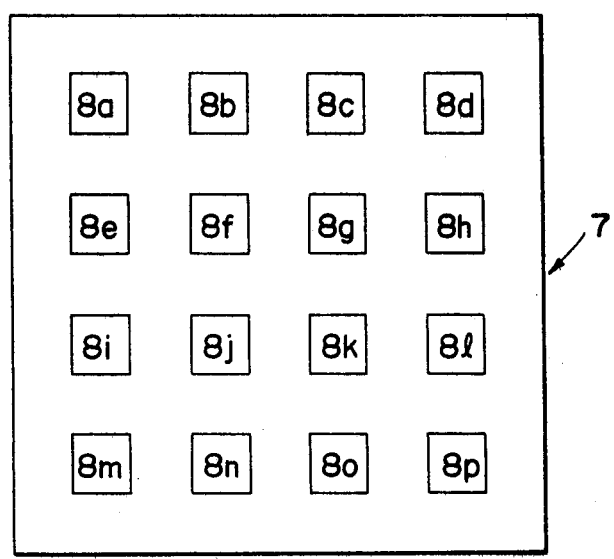
FIG. 2 is a front view showing the arrangement of the photodetector array employed in an embodiment of the present invention.

FIG. 2 shows in detail an example of the front face of the light receiving portion 7 of the light measuring device of this invention. In this example, there are employed a number of photodetectors 8a–8p arranged at equal intervals in a matrix. In this example, sixteen photodetectors (cells) 8a–8p are deposited on an N-type silicon substrate. These photodetectors 8a–8p are connected in parallel by lead wires made by vacuum deposited aluminum.

Figure 3:
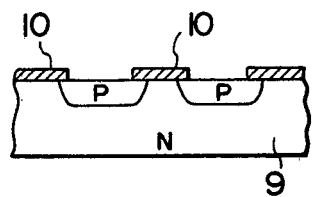
FIG. 3 is a fragmentary sectional view showing the photodetector array as shown in FIG. 2.

As shown in FIG. 3, the photodetectors 8a–8p are photodiodes made of a p-layer in which impurities are diffused in the N-type silicon substrate 9. Further, on the surface of the N-type silicon substrate 9 there is formed a silicon oxide film 10 in the areas not used for receiving light.

The photodetectors 8a–8p may have different light receiving areas or connected with different resistors so as to be weighted thereby.

FIG. 4 is a flow chart showing an example of the light measuring system in accordance with an embodiment of the present invention. The small square sections enclosed with broken lines show unit photodetectors. The numerals shown in the squares indicate the amount of weighting thereof. In the block (A) shown in FIG. 4, the numerals indicate relative values in which "1" is a unit value. In blocks (B) and (C) shown in FIG. 4, the numerals also indicate relative values in which "1" is a unit value on the same standard. In the block (A), the photodetectors are divided into a central group weighted by "4" and a marginal group weighted by "1". The outputs of the photodetectors are summed in each group and the sum of the central group is subtracted from the sum of the marginal group. The difference of the sums is examined to determine if it is smaller than a predetermined value. By this examination, it can be known if the scene is a back light scene or not. When the difference is smaller than the predetermined value, it is determined that the scene is a normal light scene. When the difference is larger than the predetermined value, it is determined that the scene is a back light scene.

Referring to FIG. 4, when the difference in brightness (designated as "brightness" in the block in FIG. 4) is below the predetermined value, it is determined that the scene is a normal light scene and the weighting of the photodetectors is made according to the weighting pattern as shown in block (B). Thus, the total of the outputs Bi of the photodetectors weighted by Ki as represented by $$\sum_{i=1}^{n} K_i B_i \qquad (1)$$

is obtained.

By multiplying the above formula (1) by $\alpha$ and adding a constant C thereto, the subject matter brightness B is obtained as follows.

$$B = \alpha \sum_{i=1}^{n} KiBi + C \quad (2)$$

Said formula (1) may be represented as follows.

$$\alpha_1 \sum_{i=1}^{n} KiBi + \beta \overline{B} \quad (3)$$

where $\overline{B}$ is an averaged brightness of the scene represented by $$\overline{B} = \frac{1}{n} \sum_{i=1}^{n} Bi.$$

Though said formula (2) uses the brightness Bi which is obtained by log-converting the output Si of the photodetectors, this may be calculated by the following formulae (4) to (7).

$$B = \log \left( \alpha_3 \sum_{i=1}^{n} KiSi + C_3 \right) \quad (4)$$

$$B = \log \left( \alpha_4 \sum_{i=1}^{n} KiSi + 4\overline{Si} + C_4 \right) \quad (5)$$

$$B = \log \alpha_5 \sum_{i=1}^{n} KiSi + \log 5\overline{Si} + \log C_5 \quad (6)$$

$$B = \log \alpha_6 \sum_{i=1}^{n} KiSi + \log C_6 \quad (7)$$

where $$\overline{Si} = \frac{1}{n} \sum_{i=1}^{n} Si.$$

It should be noted that above Ki is different for different formula though it is designated as Ki in all formulae.

When the difference in brightness is not below the predetermined value, it is determined that the scene is a back light scene and the weighting of the photodetectors is made according to the weighting pattern as shown in block (C) weighted by Ki' as represented by the formula $$B = \alpha' \sum_{i=1}^{n} Ki'Bi + C. \quad (8)$$

The weighting coefficients Ki and Ki' are determined based on the degree of importance of the position in the scene and the level of the brightness determined by the objectives.

In the block (B) for weighting the photodetectors in case of the normal light scene, the lower central portions are slightly weighted higher and the other portions and the lower right and left end of the scene are secondly weighted high. In the block (C) for weighting the photodetectors in case of the back light scene, the lower central portions are prominently weighted high and the upper central portions are secondly weighted. The weighting patterns are determined empirically.

Beside the light measuring device for giving exposure information, it is possible to provide a light measuring means particularly prepared for classifying the scene into one of the normal light scene and the back light scene.

FIG. 5 shows one example of such a device. In this example, there are provided a central photodetector 13 for measuring the brightness of the central portion and a marginal photodetector 12 for measuring the brightness of the marginal portion. The marginal photodetector 12 is provided with a light shielding cover 14 made of aluminum or the like. By the mask 14, the marginal photodetector 12 are weighted optically. Therefore, by simply comparing the output of the central photodetector 13 with that of the marginal photodetector 12, it is possible to classify the scene.

Figure 6:
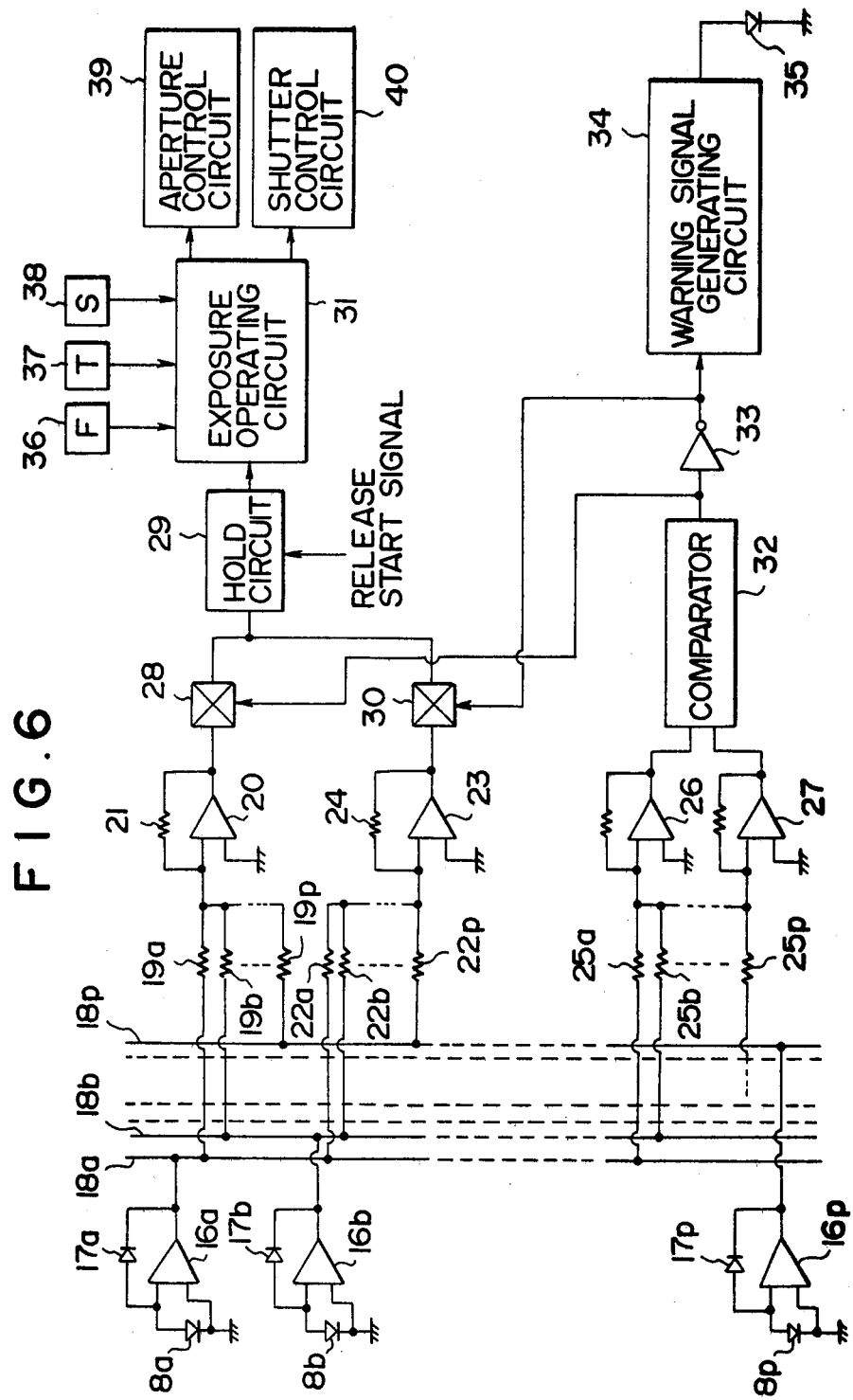
FIG. 6 is a circuit view showing an example of an electric circuit for the light measuring system in accordance with an embodiment of the present invention.

FIG. 6 shows an example of an exposure control circuit employing the light measuring system of the present invention. The photodetectors 8a-8p as of photodiodes are connected with operational amplifiers 16a-16p, respectively, and driven by a zero-bias method. The operational amplifiers 16a-16p are provided in the feedback circuit thereof with log-diodes 17a-17p so as to log-convert the photocurrent of the photodiodes 8a-8p.

The output terminals of the operational amplifiers 16a-16p are connected with a common lead lines 18a-18p with which an operational amplifier 20 is connected via resistors 19a-19p, respectively, for weighting the outputs of the photodetectors 8a-8p. In the feedback circuit of the operational amplifier 20 is provided a resistor 21 to electrically weight the measured values or outputs of the photodetectors 8a-8p together with the resistors 19a-19p, namely by the ratio of the resistance of the resistor 19a-19p to the resistance of the feedback resistor 21.

Similarly, a different set of a weighting means comprising an operational amplifier 23, a feedback resistor 24 and a number of resistors 22a-22p is connected with the common lead lines 18a-18p.

Further, in order to calculate the difference in brightness between the central part and the marginal part of the scene, resistors 25a-25p are connected with the common lead lines 18a-18p. The resistors connected with the marginal group of photodetectors are connected with an operational amplifier 26, and the resistors connected with the central group of photo-detectors are connected with another operational amplifier 27.

The operational amplifier 20 sums up the outputs of the photodiodes 8a-8p. The sum is sent to a holding circuit 29 by way of an analog switch 28. Similarly, the operational amplifier 23 conducts a weighted addition of the outputs of the photodiodes 8a-8p in a different weighting pattern. The sum is also sent to the holding circuit 29 by way of another analog switch 30. The holding circuit 29 holds the input signal upon receipt of a release start signal given by a switch (not shown) turned on by depression of a release button, and sends the held signal to an exposure operating circuit 31. The holding circuit 29 prevents the output from the analog switch 28,30 from being sent to the exposure operating circuit while the output is unstable immediately after the analog switch 28 or 30 is changed over when the result of the classification is changed due to the transition characteristics of the switches.

The output of the operational amplifiers 26 and 27 for classification is sent to a comparator 32 and the difference therebetween is examined to determine whether it is below a predetermined value. The output of the comparator 32 is sent to said analog switch 30 on the one hand and to said analog switch 28 via an inverter 33 on the other hand. The comparator 32 provides an output of level "L" in case that the difference in brightness between the central part and the marginal part is not smaller than a predetermined value and determines that the scene is a back light scene. When the comparator 32 gives an output "L", a warning signal generating circuit 34 operates by the inverted signal from the inverter 33 and energizes a light emitting element 35 located in the viewfinder or on the camera body to warn that the scene is a back light scene. This warning may be made, for example, in the form of intermittent light emission or sounding of a buzzer. When such warning is made, the photographer operates an electronic flash device for daylight synchronization. When the difference in brightness is below said predetermined value, it is determined that the scene is a normal light scene and the output level of the comparator 32 becomes "H" and the analog switch 28 is turned on. Thus, in case of the normal light scene, the output of the operational amplifier 20 is sent to the holding circuit 29. In case of the back light scene, the output of the operational amplifier 23 is sent to the holding circuit 29 by way of the other analog switch 30.

The image brightness information held in the holding circuit 29 is sent to an exposure operating circuit 31. The exposure operating circuit 39 conducts a photographic exposure processing of various kinds of exposure information such as aperture setting information from an aperture information input means 36, shutter speed setting information from a shutter speed information input means 37 and film sensitivity information from a film sensitivity information input means 38 together with the image brightness information from the holding circuit 29. By the output of the exposure operating circuit 31, one or both of a shutter speed control circuit 40 and an aperture control circuit 39 are controlled to properly control exposure.

Figure 7:
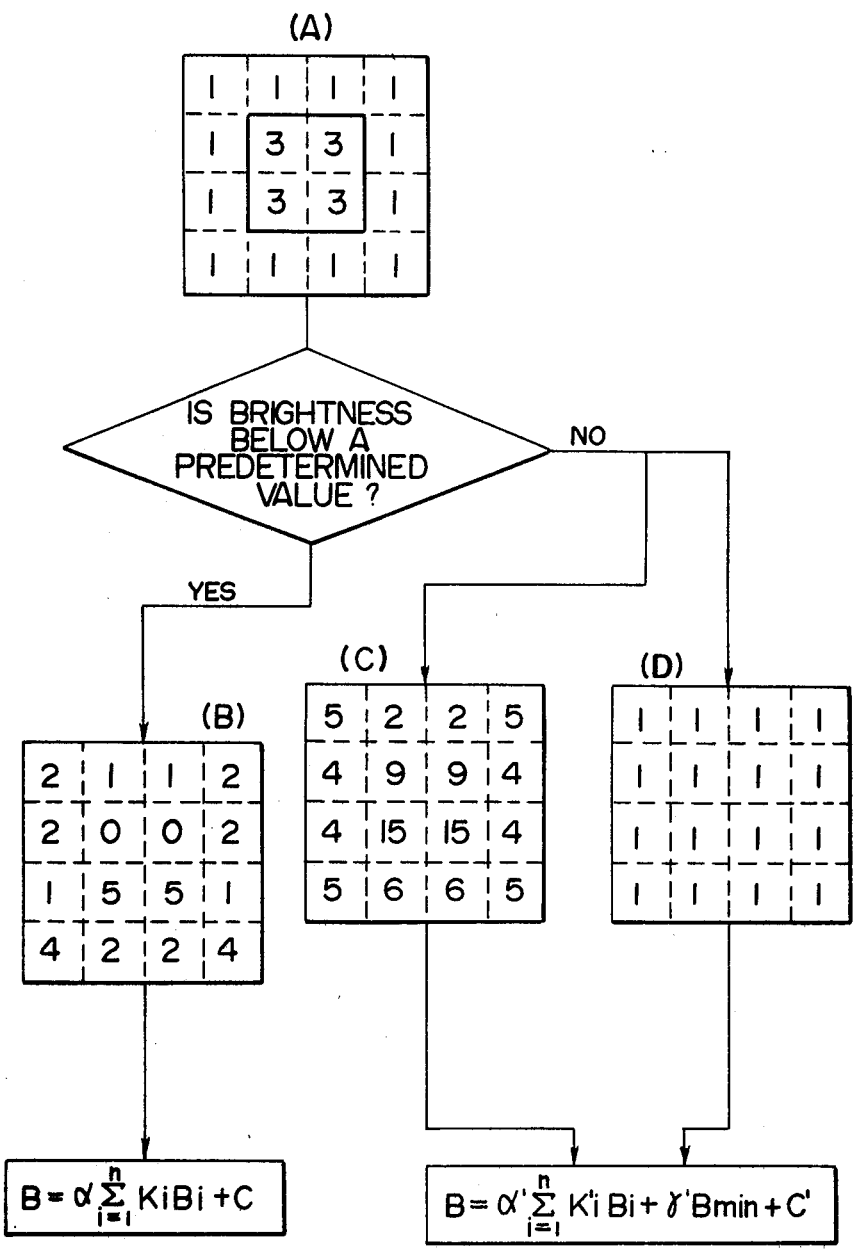
FIGS. 7 and 8 are flow charts for explaining other examples of the light measuring system of the present invention.

FIG. 7 is a flow chart for explaining another example of the present invention in which the image brightness information is obtained by use of the minimum brightness value in case of a back light scene. When it is determined that the scene is a back light scene, the weighting as shown in block (C) is conducted to obtain $$B = \alpha' \sum_{i=1}^{n} K_i B_i.$$

At the same time, the minimum value Bmin is obtained by comparing all the outputs of the photodetectors. By use of these values, the brightness information B as represented by the formula (9) is obtained.

$$B = \alpha' \sum_{i=1}^{n} K_i' B_i + \gamma' B\min + C' \qquad (9)$$

where $\alpha'$, $K_i'$, $\gamma'$ and $C'$ are coefficients. This formula embraces four cases, to wit, when $\alpha'=0$, $C'\neq0$; $\alpha'\neq0$, $C'=0$; $\alpha'=0$, $C'=0$; and $\alpha'\neq0$, $C'\neq0$. For the minimum value Bmin, the block (D) is used.

Figure 8:
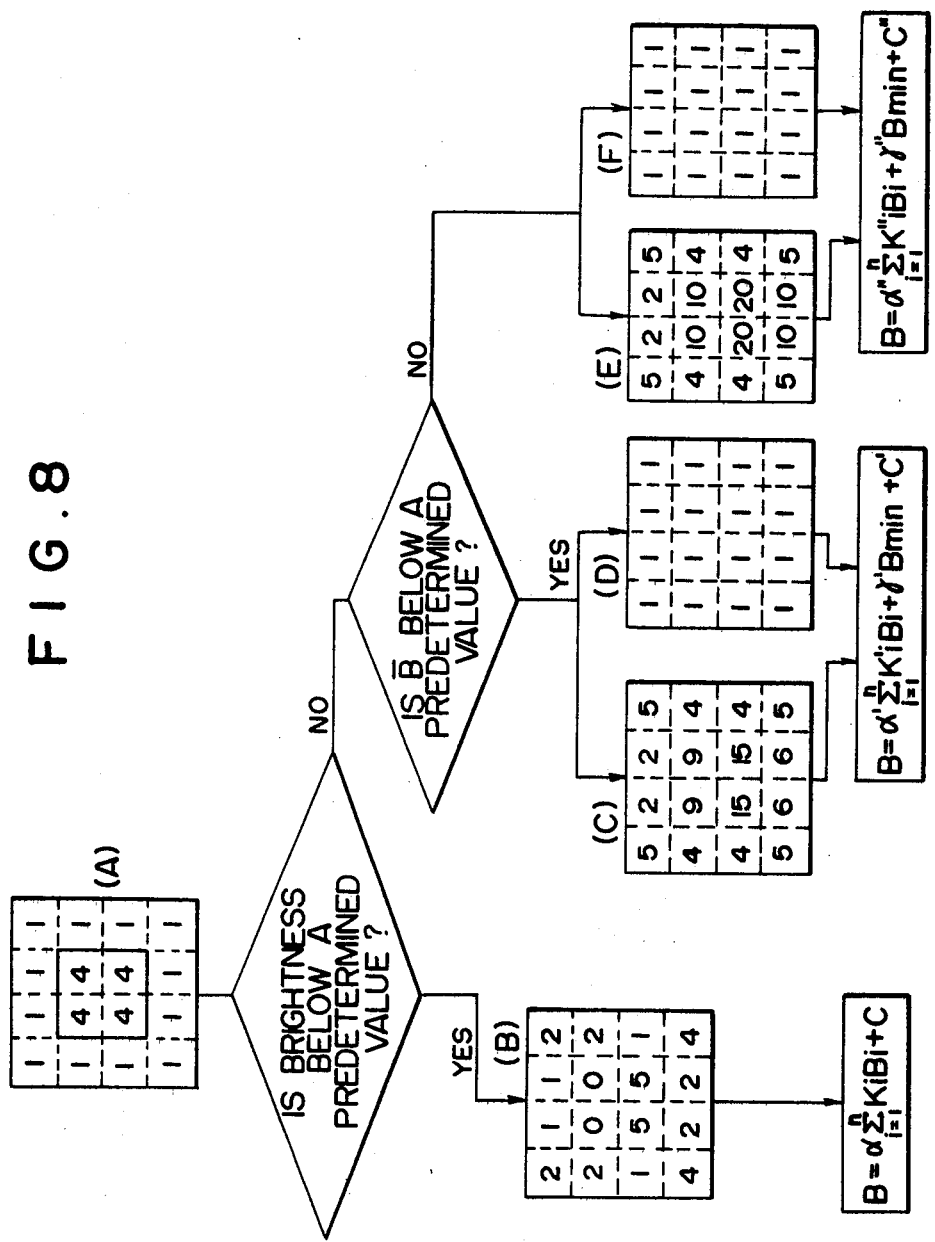

FIG. 8 is a flow chart explaining a further embodiment of the present invention in which the scene is first classified into a normal light scene and a back light scene by use of a predetermined value, and the back light scene is further classified into a medium back light scene and an extreme back light scene. Since the required amount of exposure differs according to whether the back light scene is moderate or extreme, the control of exposure can be made better by further finely classifying the back light scene as in this example.

Figure 9:
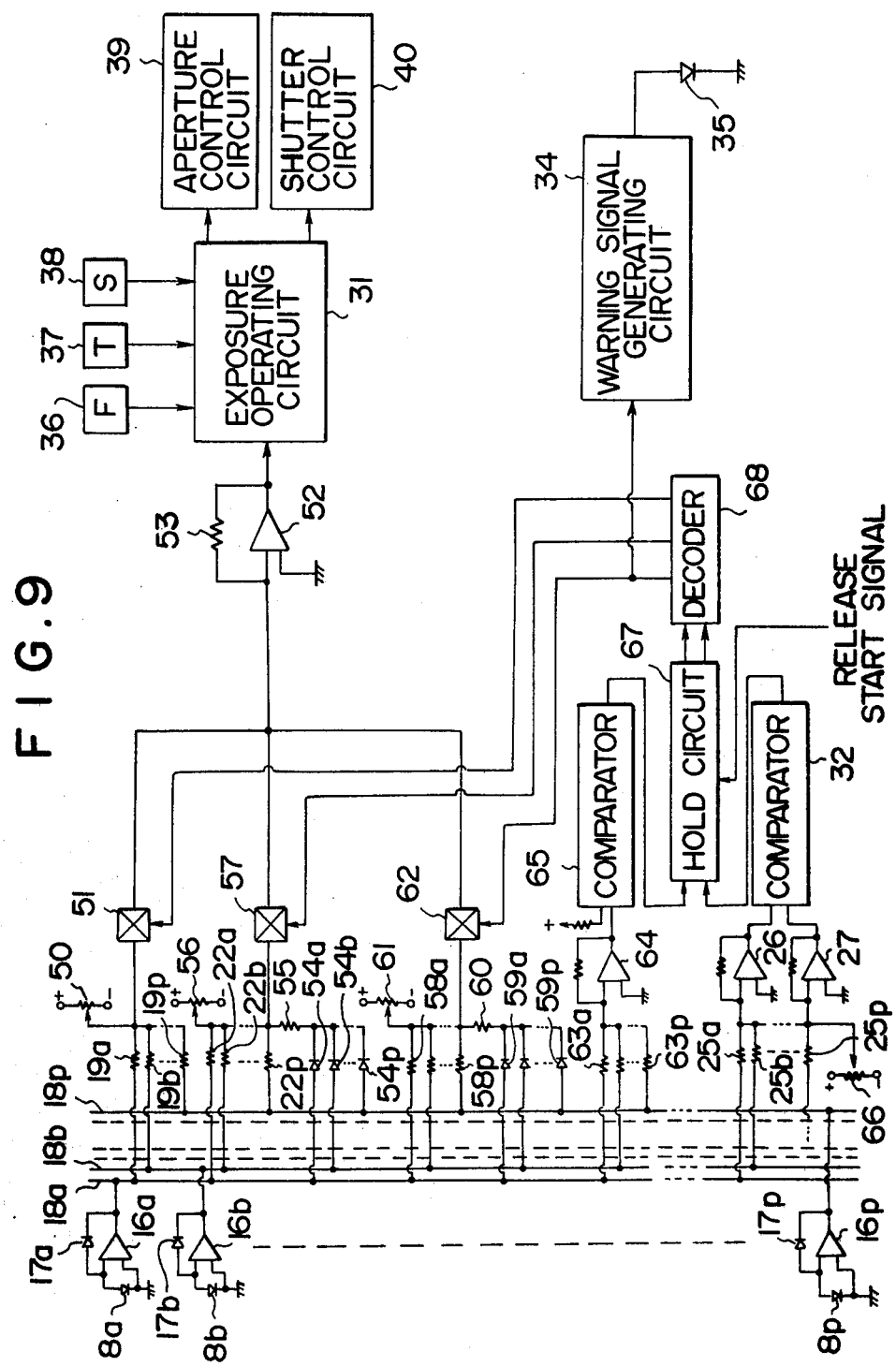
FIG. 9 is a circuit view showing an embodiment of the electric circuit for the light measuring system as shown in FIG. 8.

FIG. 9 shows an electric circuit for operating the image brightness according to the finely classified back light scene as shown in FIG. 8. In the circuit shown in FIG. 9, all the elements equivalent to those shown in FIG. 6 are designated by the same reference numerals and the detailed description thereof will be omitted hereinbelow. Referring to FIG. 9, the weighting resistors 19a-19p and a potentiometer 50 are connected in parallel and connected to one input terminal of an operational amplifier 52 by way of an analog switch 51. By the ratio of these resistors 19a-19p to a feedback resistor 53, the outputs of the photodiodes 8a-8p are electrically weighted. Common lead lines 18a-18p are connected with resistors 22a-22p for conducting weighting for the normal back light scene. The common lead lines 18a-18p are further connected with diodes 54a-54p to detect the minimum brightness Bmin. The cathodes of the diodes 54a-54p are connected with a resistor 55. The resistor 55, a potentiometer 56 for setting a constant and weighting resistors 22a-22p are connected in series and connected to one input terminal of an operational amplifier 52 by way of an analog switch 57. Similarly, weighting resistors 58a-58p, minimum detecting diodes 59a-59p, a resistor 60 and a potentiometer 61 provides an operating means for an extreme back light scenes. The operating portion is connected to said operational amplifier 52 by way of an analog switch 62. Further, weighting resistors 63a-63p and an operational amplifier 64 provides a circuit for calculating an average brightness $\overline{B}$. The signal representing the average brightness $\overline{B}$ is sent to a comparator 65 and is examined there to determine whether it is below a predetermined value.

Further, in order to obtain the difference in brightness between the central portion and the marginal portion, resistors 25a-25p are connected with the common lead lines 18a-18p. The resistors of the central group and a potentiometer 66 are connected with an operational amplifier 27, and the resistors of the marginal group are connected with an operational amplifier 26. The outputs of the operational amplifiers 26 and 27 for classification are sent to a holding circuit 67 by way of the comparator 32. The output of the comparator 32 indicates if the difference in brightness between the marginal portion and the central portion is below a predetermined value and the output of the comparator 65 indicates if the average brightness $\overline{B}$ is over the predetermined value or not. These outputs are sent to a decoder 68 by way of the holding circuit 67. The decoder 68 classifies the scene into normal light, back light, and extreme back light in view of the combination of the outputs of the comparators 32 and 65, and makes the level of the output of one of its output terminals "H". In case of the normal light scene, the analog switch 51 is turned on. In case of the moderate back light scene, the analog switch 57 is turned on. In case of the extreme back light scene, the analog switch 60 is turned on. In the extreme back light scene, a beautiful photo is often successfully taken by use of an electronic flash device. Therefore, in this embodiment when the scene is classified as extreme back light, the output of the decoder 68 is sent to the warning signal generating circuit 34.

Figure 10:
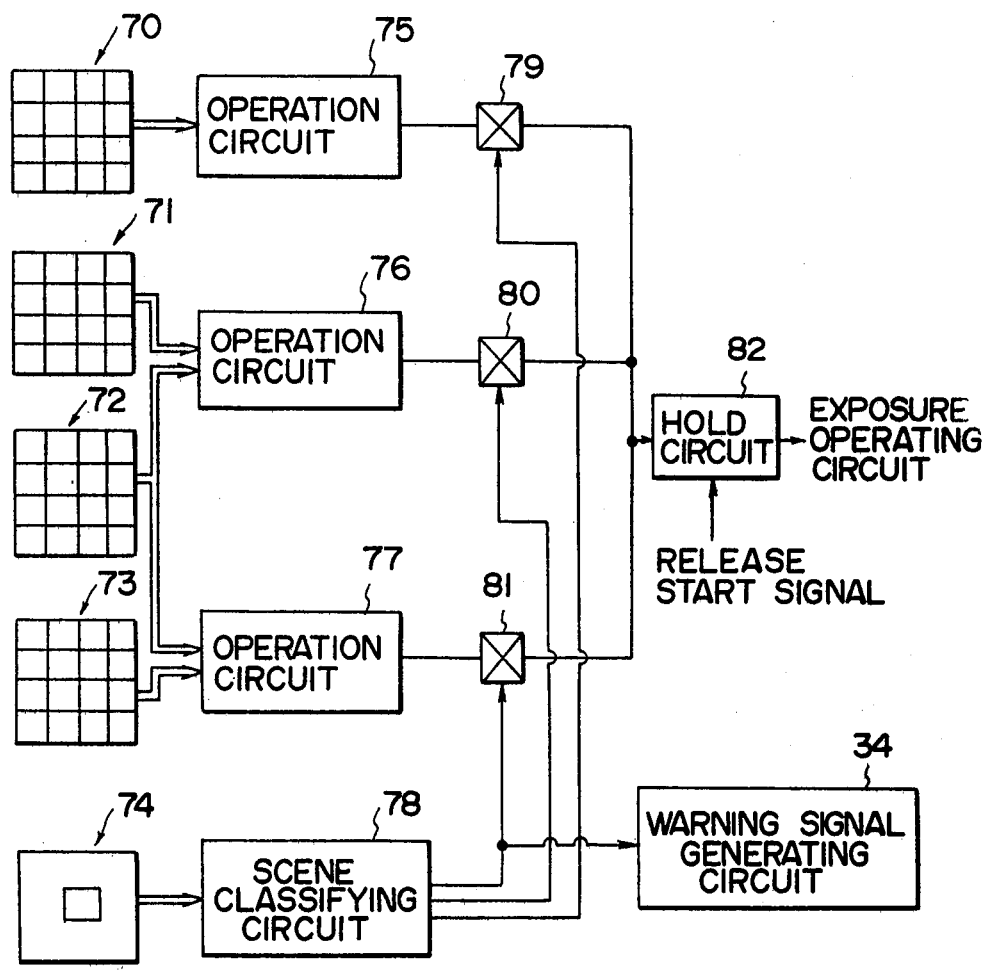
FIG. 10 is a block diagram showing an embodiment of the light measuring system of the present invention using a plurality of light receiving arrays.

FIG. 10 shows an example in which differently weighted light receiving arrays are employed. Light receiving arrays 70, 71, 72, 73 each consist of a number of photodiodes covered with different masks to be differently weighted. Another light receiving array 74 consists of a central photodetector and a marginal photodetector. The first array 70 is weighted in the same pattern as that of the block (E) in FIG. 8. The array 71 is the same as that as shown in FIG. 8 at block (C), the array 72 is the same as that as shown in FIG. 8 at block (D) or (F), and the array 73 is the same as that shown in FIG. 8 at block (E). By the array 72, the minimum value is detected. The array 74 may be the same as that as shown in FIG. 5.

The output of the light receiving array or photodetector array 70 is sent to an operation circuit 75 where the formula (2) is processed. The output of the array 71 and the minimum value detected by the array 72 are sent to an operation circuit 76 where the formula (8) is processed. Similarly, the output of the array 73 and the minimum value detected by the array 72 are sent to an operation circuit 77.

The outputs from the array 74 representing the central brightness, marginal brightness and average brightness are sent to a scene classification circuit 78, where the scene is classified. By the result of the classification, one of the analog switches 79–81 is turned on and the brightness information processed by the proper formula is sent to the exposure operating circuit as shown in FIG. 6 by way of the holding circuit 82. The holding circuit 82 holds the selected brightness information upon receipt of a release start signal.

In the above described embodiment, the photodetectors are connected in parallel and the parallel circuit of the photodetectors is simply connected with two input terminals of an operational amplifier for weighted addition. This is advantageous in simplification of the circuit.

FIG. 11 shows another embodiment of the present invention in which the average brightness $\bar{B}$ is used also for the normal light scene to make accurate weighting for both the moderate normal light scene and the bright normal light scene. By making such arrangements, the scenes are divided into four groups. Such four groups have of course narrower ranges than the two roughly divided groups, and accordingly the exposure can be more finely and accurately controlled.

I claim:

1. Apparatus for measuring the scene brightness of subject matter to be photographed, the apparatus comprising lens means for focusing an image of a scene including said subject matter; a plurality of photodetectors arranged over an area of the image of the scene focused by said lens means, with one or more of said photodetectors being arranged in a central portion and others thereof in a marginal portion of said image; weighting means including a plurality of groups of weighting resistors, the resistors of each of said groups being at least selectively coupled to receive associated outputs of said photodetectors, with said weighting resistors having values selected for differently weighting the outputs of the associated photodetectors in accordance with the relative positions of the latter; summing means having an input connected to the other ends of the resistors of at least a selected one of said groups thereof for summing the weighted outputs of said photodetectors to produce a scene brightness output; classifying means for classifying the scene into one of at least a normal light scene and a back light scene based on the difference between the weighted outputs of the photodetectors of said central portion and the weighted outputs of the photodetectors of said marginal portion, and providing a classification output; and selecting means for selecting, in response to said classification output, the scene brightness output as weighted by a selected one of said groups of weighting resistors.

2. An apparatus for measuring the scene brightness as defined in claim 1 wherein said selecting means includes analog switches connected following said weighting means.

3. An apparatus for measuring the scene brightness as defined in claim 1 wherein said classifying means comprises means for providing the difference between the weighted outputs of the central portion photodetectors and the marginal portion photodetectors, comparing means for comparing such difference with a predetermined value, and classification output means for generating an output signal indicating that the scene is a normal light scene when said difference is smaller than the predetermined value and that the scene is a back light scene when said difference is not smaller than the predetermined value.

* * * * *